United States Patent [19]

Prescott

[11] 3,913,288

[45] Oct. 21, 1975

[54] FASTENING DEVICE FOR INTERLOCKING PANELS

[76] Inventor: Dale B. Prescott, 461 Fox Hills Drive North, Bloomfield Hills, Mich. 48013

[22] Filed: Oct. 24, 1974

[21] Appl. No.: 517,474

[52] U.S. Cl. ..................... 52/127; 52/486; 52/489
[51] Int. Cl.² ......................................... E04D 3/362
[58] Field of Search ............ 52/127, 489, 486, 478, 52/760, 520, 534, 545, 714, 748

[56] References Cited
UNITED STATES PATENTS

| 2,743,148 | 4/1956 | Tedaldi | 52/760 X |
| 3,511,011 | 5/1970 | Straus | 52/489 X |

*Primary Examiner*—J. Karl Bell
*Attorney, Agent, or Firm*—William T. Sevald

[57] ABSTRACT

A fastening device for securing building panels to a supporting structure without perforating the panels with bolts, screws, etc., wherein the building panels have opposite side edges equipped with a reverse-bend male flange on one side edge and a reverse-bend female flange on the other side edge with the male flange of a panel nesting within the female flange of the next adjacent panel joining and interlocking the panels and wherein the support structure includes a transverse beam having a rib extending away from the panels. The fastener device has an L-shaped head forming a channel which fits over the male flange, a leg leading from the head to the rib on the beam, and a hook on the leg engaging the rib on the beam. During attachment, the male flange is forceably sprung towards the beam to slide the hook past the rib and upon release, the fastener lies in tension between the male flange and the beam. The female or overlapping flange is then placed over the fastener head and the male flange. The reverse-bends of the mating flanges are then crimped with the fastener head between them locking the fastener in place and securing the male flange to the female flange and to the fastener head. The hook portion has a point for penetrating an insulation layer lying between the panels and the supporting structure.

3 Claims, 7 Drawing Figures

U.S. Patent  Oct. 21, 1975  3,913,288

FASTENING DEVICE FOR INTERLOCKING PANELS

BACKGROUND OF THE INVENTION

Flanged interlocking building panels have been attached to supporting structures by bolts, screws, etc., which require a receiving aperture or hole in the panel so that the screw can lead therethrough. The hole has proved to be a source of leaks, especially in roof panels, in spite of the use of sealing washers, special sealing heads on the screws, sealing compound, etc. Also to attach the panels with screws, the workman must have a drill to make the hole in the panel and in the beam or purlin below the panel. This requires electrical power, drill motor, drill, etc., and wrenches to tighten the screws. When an insulation layer lies between the panel and the purlin, the insulation fibers may cause jamming of the drill bit and the insulation layer may get torn or ripped. It takes a workman considerable time to drill the hole in the panel, insulation layer, and purlin and it takes more time to tighten the screw in the holes. It is also difficult to suitably draw down the screw when an insulation layer is used with the result that the screw sometimes is too tight crushing the insulation layer or sometimes too loose and thus not making a proper seal at the aperture in the panel. With an insulation layer the screw cannot be tightened hard to seal the panel aperture as the insulation layer is too yieldable. Also as the insulation layer compacts with time, the washer seal at the panel hole loosens so that it is not sealably engaged and leaks occur which also wet the insulation layer destroying its thermal effectiveness.

SUMMARY OF THE PRESENT INVENTION

The fastening device of the invention has a L-shaped head at one end, a hook at the other end, and a leg interconnecting the head and the hook. The device secures building panels to a supporting structure without the need of apertures in the panels such as required when bolts or screws are used.

The fastener L-shaped head fits over a relatively smaller reversely bent male or inner flange on one edge of a panel; the fastener leg extends into the support structure below the panel; and the fastener hook engages a rib on the support structure. In integrating the fastening device with the male flange, the fastener head is fitted over the male flange, and the flange forceably flexed toward the beam and the hook then forced over the rib so that when the flange is released, its springback tensions the fastening device between the beam or purlin and the panel. Conversely, the hook may be first engaged with the support structure, the male flange forceably flexed toward the support structure, the L-shaped head placed over the male flange so that upon release of the flange it springs back tensioning the fastening device between the support structure and the panel.

After the male flange of the panel is so secured at the cross-members of the support structure, the female flange of the next adjacent panel is placed over the secured male flange and the L-shaped head of the fastener. Then the mating reverse-curve bends of the flanges are crimped together interlocking the two flanges with the L-shaped head of the fastening device interlocking between them.

When an insulation layer is used between the panels and the support structure, the increase in cross-section dimension between the panel flanges and the rib on the support structure is accommodated by increasing the length of the leg portion of the fastening device a like extent. Conversely when an insulation layer does not intervene, fastening devices with shorter legs are used.

The fastening device at the hook end is provided with a penetrating point which facilitates piercing through an insulation layer without tools and without damaging the insulation layer.

The fastening device thus secures the panels in an unperforated or holeless condition so that no leaks develop at the time or later, rendering the structure substantially leak-proof.

The fastening device thus quickly attaches the panels without the use of drills, electric power, wrenches, drivers, etc., and without the time involved in making holes, inserting screws, and tightening them down with wrenches.

The fastening device also holds the panels in tensioned condition of like force with or without an insulation layer so that the presence of an insulation layer does not adversely affect the tension of the attachment.

The foregoing will become apparent by reference to the detailed description of the illustrated embodiment of the invention taken in connection with the accompanying drawing now described.

DETAILED DESCRIPTION OF THE ILLUSTRATED EMBODIMENT

Figure 1:
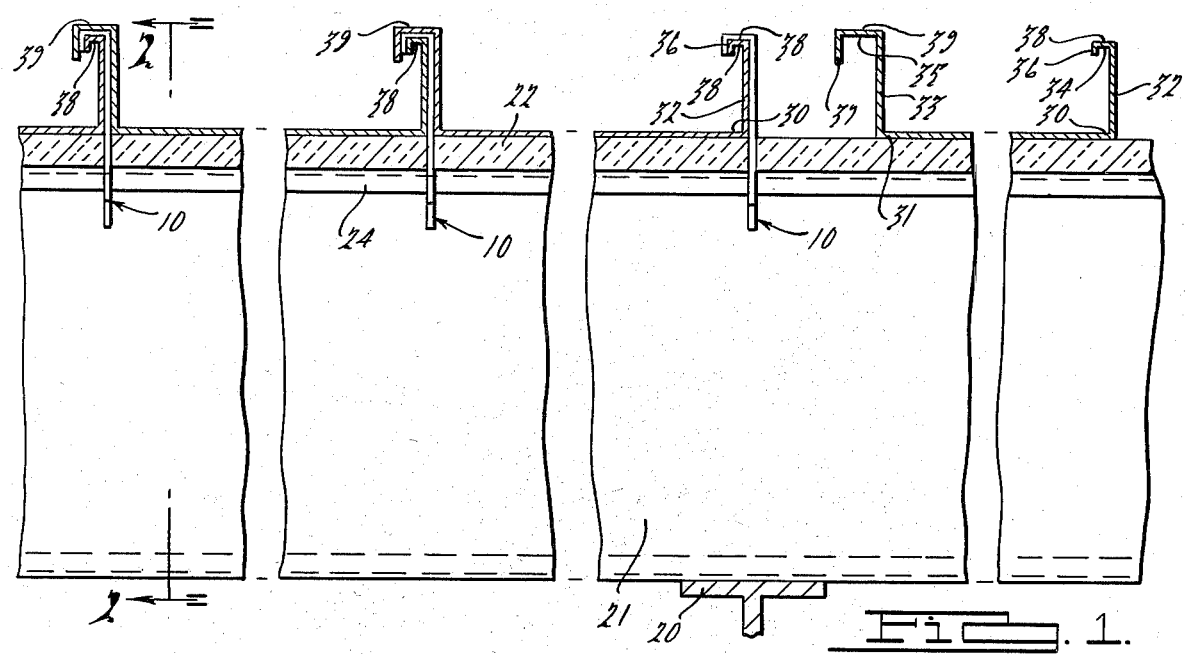
FIG. 1 is a partial cross-sectional view of a building panel enclosure and insulation layer on a supporting structure; — broken away at the ends and broken away intermediately to indicate foreshortening of the width of the panel; — showing at the left and center completely fastened flange sets with the fastening device in position, and at the right a fastened male flange on one panel and the female flange on the next adjacent panel prior to emplacement.
Figure 2:
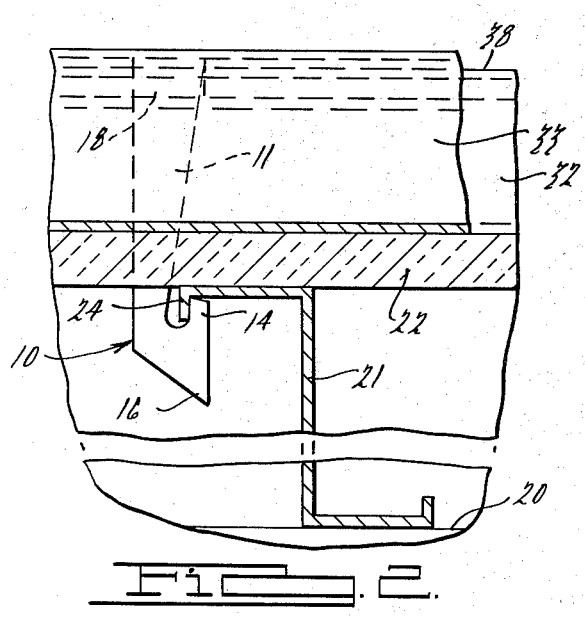
FIG. 2 is a partial cross-sectional view of the completed assembly seen in FIG. 1, taken on the line 2—2 thereof, with parts broken away.

Referring now to the drawings wherein like reference numerals refer to like and corresponding parts throughout the several views, a preferred embodiment of the fastening device 10 disclosed therein, comprises a leg 11 having opposite ends. An L-shaped head 12 is formed on one end of the leg 11 forming a U-shaped channel 13 with the leg 11. The channel 13 lies on an axis in one direction. A hook 14 is formed on the other end of the leg 11. The hook 14 has an eye 15. The eye 15 lies on an axis normal to the axis of the channel 13.

A point 16 is formed on the outer end of the hook 14. A span portion 17 and a finger 18 constitute the L-shaped head 12.

A roof section of a building structure is selected to illustrate the use of the fastening device 10 of the invention although any wall is suitable. The supporting structure includes a truss 20, a cross-beam or purlin 21, an insulation layer 22, and like roof panels 23. It will be noted that in FIG. 3 the insulation layer is not used between the panels 23 and the purlin 21. The purlin 21 may be S-shaped as shown or any suitable shape. The cross-beam or purlin 21 has an inwardly extending rib 24. Any type projection or aperture may be used instead of the rib 24 as shown as its purpose in the assembly is to engage the hook 14 of the fastening device 10.

The panels 23 lie normal to the purlin 21 and each panel 23 has opposite side edges 30 and 31. A male or inner flange 38 is formed on the edge 30 and includes a riser 32, a span 34, and a reverse bend 36. The male flange 38 overlies the panel at the side edge 30. A female or outer flange 39 is formed on the edge 31 and includes a riser 33, a span 35, and a receiver band 37, all of which are respectively larger than their counterparts of the male flange 38 so that they fit thereover in nested relationship. The female flange 39 lies outwardly of the side edge 31 so as to overlap the male flange 38 when the side edge 31 of one panel 23 lies adjacent the side edge 30 of the next panel 23.

In use and operation, the fastening device 10 secures the panels 23 to the cross-beam or purlin 21. As seen in FIG. 1, the panels 23 are laid-on from left-to-right and the panels 23 shown at the left and center of FIG. 1 have been secured while the male flange 38 shown at the right of FIG. 1 is exposed. In mounting the fastening device 10 on the male flange 38 as shown at the right of FIG. 1, the L-shaped head 12 is fitted over the male flange 38 with the fastener finger 18 overlying the flange bend 36; the fastener span portion 17 overlying the panel span 34; and the fastener leg 11 overlying the flange riser 32. The male flange 38 and the fastening device 10 so integrated are both sprung outwardly of the panel 23 toward the purlin 21 and the hook 14 is engaged with the rib 24 on the purlin 21. The male flange 38 and fastening device 10 are then released and the male flange 38 springs back tensioning the fastening device 10 between the male flange 38 and the rib 24 on the purlin 21. As previously described, this procedure may be reversed and the hook 14 first engaged with the purlin 21, the male flange 38 then flexed toward the purlin 21, and the finger 18 and span portion 17 of the L-shaped head 12 then placed over the male flange 38 with subsequent release effecting the tensioned attachment.

The next panel 23 is then moved up to the secured panel 23 and the female flange 37 of the next panel 23 is placed over the male flange 38 and the fastener L-shaped head 12 and the adjacent portion of the fastener leg 11 so that the flange riser 35 overlies the flange riser 34 and fastener leg 11; the flange span 35 overlies the fastener span portion 17 and flange span 34; and the flange reverse bend 37 overlies the fastener finger 18 and the flange reverse bend 36. The flange reverse bends 36 and 37 and the fastener finger 18 are then crimped together interlocking the fastening device 10, the male flange 38, and the female flange 39 together and securing the adjacent panel 23 at its female flange edge 31 to the purlin 21 of the support structure.

Figure 3:
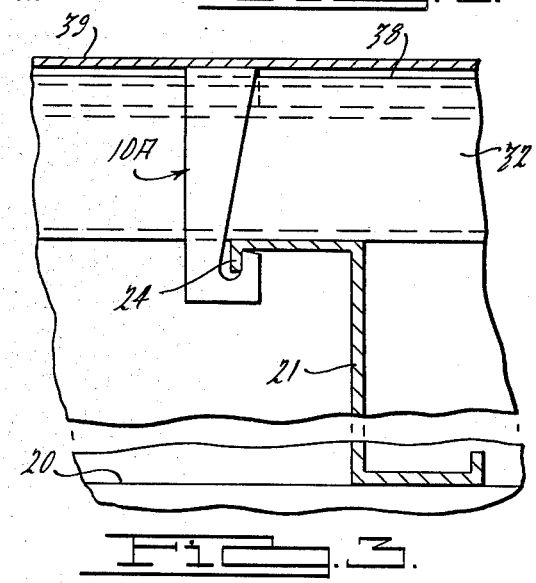
FIG. 3 is a view similar to FIG. 2, with the insulation layer deleted, the fastening device having a shorter leg, and the point on the hook deleted.
Figures 4, 5:
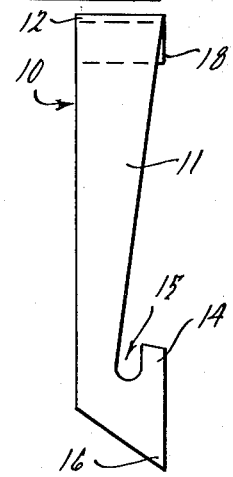
FIG. 4 is a side elevational view of the fastening device as seen from the right side of FIG. 5.
FIG. 5 is an edge elevational view of the fastening device as seen from the right side of FIG. 4.
Figure 6:
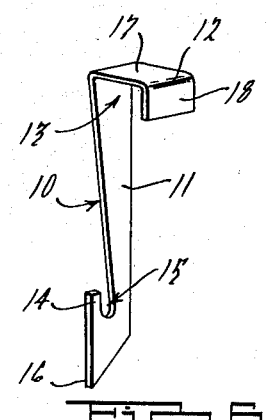
FIG. 6 is a perspective view of the fastening device.
Figure 7:
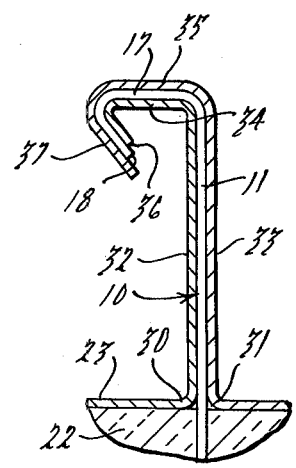
FIG. 7 is an enlarged cross-sectional view of the flange portion of a completed and fastened assembly showing the interconnection of the reverse curve bend flanges and the L-shaped head of the fastening device in crimped interlocked condition in clearer detail.

It will be noted that the fastening device 10A of FIG. 3 does not have a point 16 and that no insulation layer 22 is employed. It will also be noted that where the insulation layer 22 is used, that the fastening device 10 is formed with a point 16 providing means for piercing the insulation layer 22 to locate the hook 14 at the purlin 21 without damaging the insulation layer 22 and to provide ease and facility in mounting.

While the fastening device 10 has been shown as a flat metal shape with the head 12 and hook 14 in angular planes to each other, it will be understood that they may lie in the same plane, may be made of wire and/or synthetic resin and shaped and adapted to suit the conformation of panels other than shown and described for purposes of illustration as the protective scope of the invention is limited only by the terms of the appended claims.

I claim:

1. A fastener for securing like building panels in adjacent side-by-side relationship to a support structure,
    wherein each panel has opposite side edges with one side edge having a relatively shorter male flange terminating in a relatively smaller sidewise inwardly extending reverse bend overlying the one side edge, and
    the other side edge having a relatively longer female flange terminating in a relatively larger sidewise outwardly extending reverse bend out-lying the other side edge, and
    wherein the male flange of one panel lies within the female flange of the next adjacent panel in nested relationship, and
    wherein the support structure comprises beams lying transverse to the panels having an inwardly extending rib relative to the panels;
    said fastener having an L-shaped head for fitting over said male flange, a leg portion leading from said head past said male flange and to the rib on the beam of the support structure, and a hook end for engaging the rib on the beam directly securing said panels at their male flanges to the support structure;
    the female flange of the adjacent panel nesting over said L-shaped head of said fastener as well as over the male flange of the adjacent panel,
    upon crimping the nested male and female flanges with said fastener head nested between them in interlocked condition, said fastener secures both said panels to the support structure.

2. In a fastener as set forth in claim 1,
    said hook of said fastener lying transverse to said L-shaped head of said fastener.

3. In a fastener as set forth in claim 1,
    said hook having a piercing point for penetrating insulation lying between the panels and the support structure.

* * * * *